Oct. 23, 1923.
F. A. HEADSON
1,471,603
SPEED CHANGING POWER TRANSMISSION MECHANISM FOR PAPER MAKING
MACHINES AND OTHER SIMILAR MACHINES
Filed Aug. 26, 1922
3 Sheets-Sheet 1
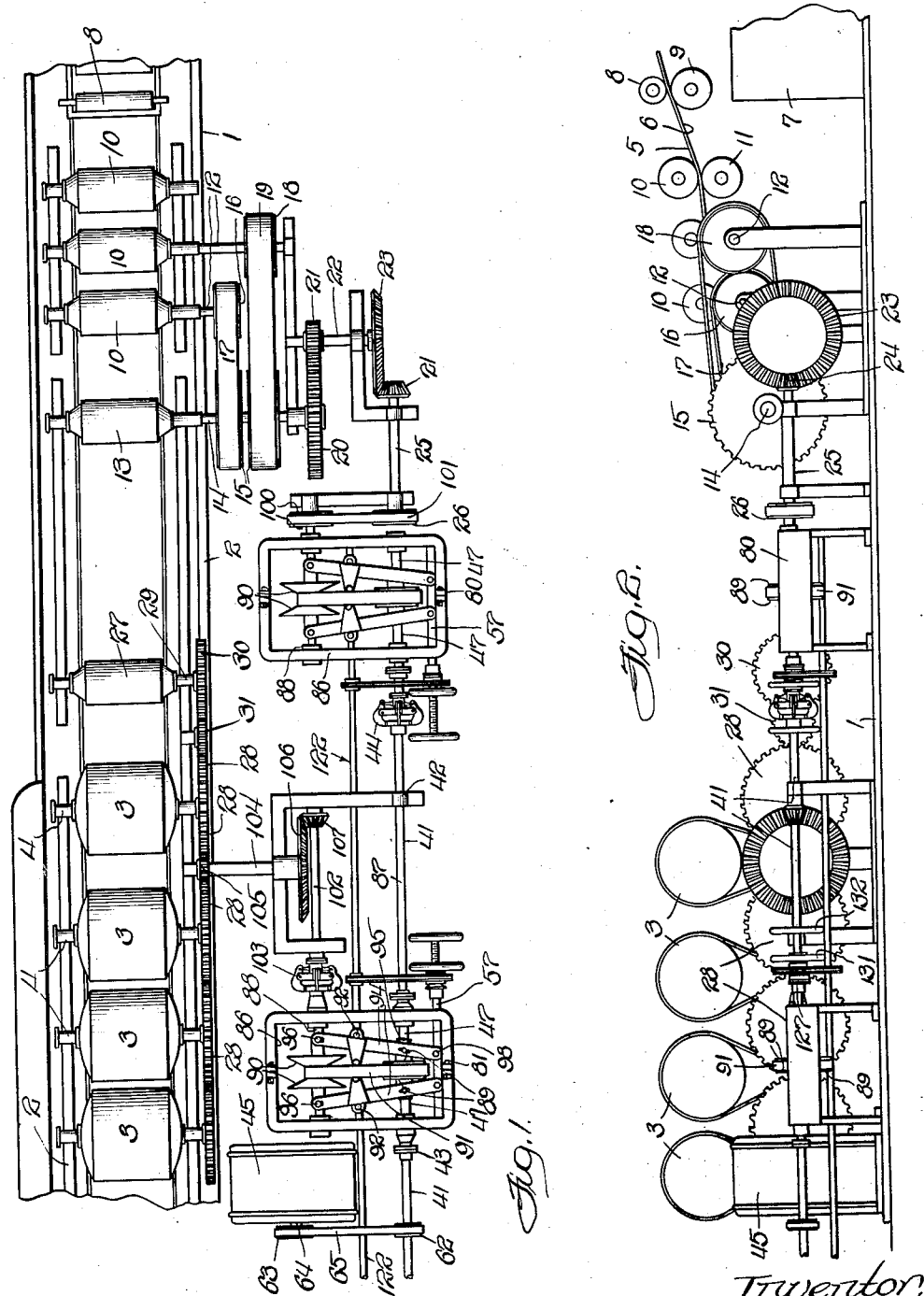

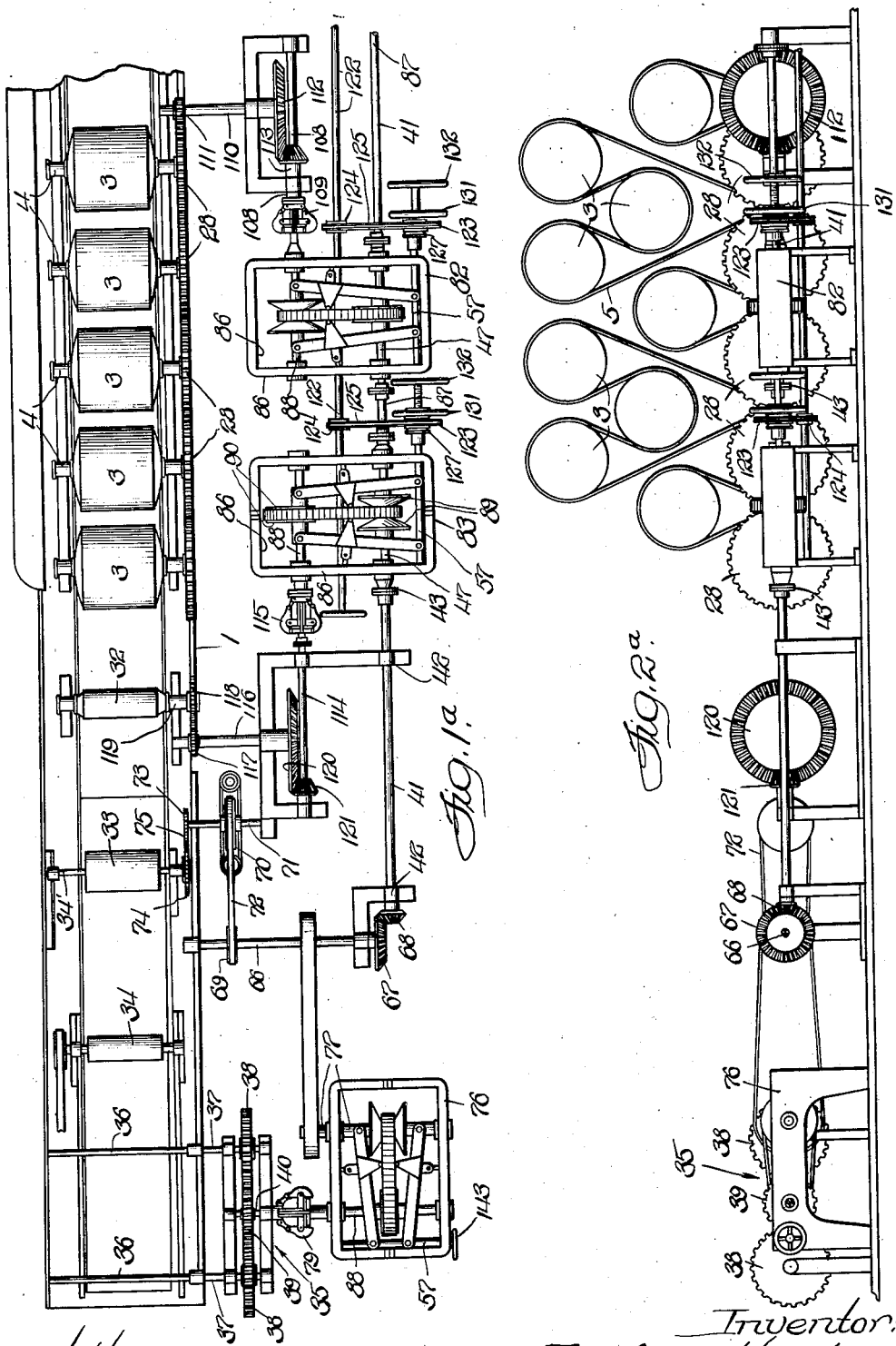

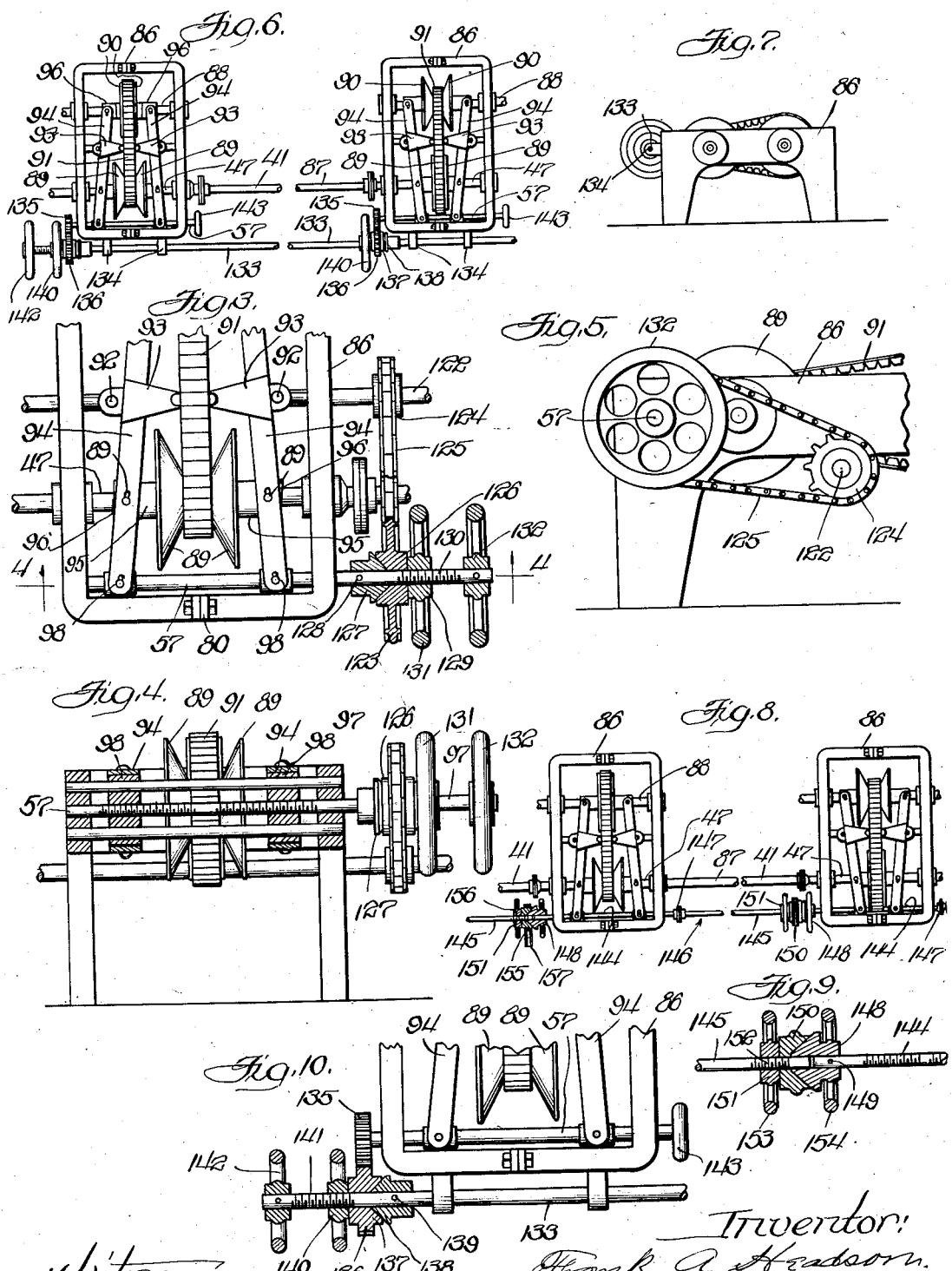

Patented Oct. 23, 1923.

1,471,603

UNITED STATES PATENT OFFICE.

FRANK A. HEADSON, OF MILWAUKEE, WISCONSIN.

SPEED-CHANGING POWER-TRANSMISSION MECHANISM FOR PAPER-MAKING MACHINES AND OTHER SIMILAR MACHINES.

Application filed August 26, 1922. Serial No. 584,535.

*To all whom it may concern:*

Be it known that I, FRANK A. HEADSON, a citizen of the United States, residing in Milwaukee, in the county of Milwaukee and State of Wisconsin, have invented certain new and useful Improvements in Speed-Changing Power-Transmission Mechanisms for Paper-Making Machines and Other Similar Machines, of which the following is a specification.

This invention relates to new and useful improvements in speed changing power transmission machines for paper-making machines or other similar machines, having a series of drying rolls or similar elements adapted to be connected with a suitable source of power, and provided with means for enabling such rolls or similar elements to be operated at any desired predetermined speed with respect to each other, and with respect to the main driving shaft or driving mechanism.

It relates particularly to an improved means for changing, regulating and controlling the speed of each or any desired one or more of a plurality of individual variable speed or speed changing power transmission belt and pulley devices, or units, with respect to each other accurately to any desired extent and in any desired order.

It relates further to a simple and efficient means for enabling the speed of operation of any desired number or all of such individual variable speed mechanisms, or units, to be changed together or simultaneously and uniformly, or each to the same extent, as desired.

The principal object of the invention is to provide a simple, economical and efficient driving and speed changing power transmission mechanism for paper-making machines, or other or similar machines.

A further object of the invention is to provide a simple, economical and efficient paper-making machine, having paper-making or drying rolls adapted to be operated at suitable variable speeds of rotation with respect to each other; and to provide a suitable speed changing or variable speed power transmission mechanism operatively connected with such rolls or similar elements, and comprising a plurality of individual variable speed belt and pulley mechanisms, or units, operatively connected with such rolls and with a main driving shaft, and means for enabling the speed of operation of any desired number of such individual variable speed belt and pulley mechanisms to be changed with respect to each other in any desired order, and to exactly any desired extent within suitable predetermined limits of speed.

A further object of this invention is to provide means for enabling the speed of any desired number of such units or variable speed belt and pulley mechanisms and the rolls or similar elements operated thereby to be changed simultaneously and uniformly to any desired extent, as required.

Other and further objects of the invention will appear from the following description and claims, and from the accompanying drawings, which are made a part of this specification.

The invention consists in the features, combinations of elements, details of construction and arrangement of parts herein described and claimed.

In the accompanying drawings,

Figure 1—1ª is a diagrammatic plan view of a paper-making machine provided with my improved mechanism for driving and controlling or varying the speed of rotation of the rolls relatively to each other and to the other moving parts of the machine;

Fig. 2—2ª is a view in side elevation of the machine shown in Figure 1—1ª;

Fig. 3 is an enlarged plan view in detail of one of the individual variable speed power transmission belt and pulley devices, or units, shown in Figs. 1—1ª and 2—2ª;

Fig. 4 is a transverse sectional view of the mechanism shown in Fig. 3, taken on line 4—4 of said figure;

Fig. 5 is a side view in elevation of the mechanism shown in Fig. 3 as seen from the right side of said figure;

Fig. 6 is a plan view in detail of a plurality of individual speed changing or variable speed belt and pulley mechanisms, showing the same all operatively connected with the same main speed changing shaft by means of clutch and spur gear mechanism, in accordance with my invention;

Fig. 7 is a side view in elevation of the mechanism shown in Fig. 6, as seen from the right side of said figure; and Fig. 8 is a plan view of a plurality of individual speed changing or variable speed belt and pulley mechanisms, such as are shown in Figs. 6 and 7, but showing the right and left screw threaded adjusting screws of a plurality of said individual variable speed belt and pulley mechanisms, or units, in the form of detachably connected sections of a continuous sectional speed changing shaft, the same being a modified form of my invention;

Fig. 9 is an enlarged detail view in section of the means for connecting and disconnecting the separable sections of the speed changing screw rod or shaft shown in Fig. 8 and shows means for enabling the individual variable speed belt and pulley devices to be operated independently of each other or simultaneously as desired; and Fig. 10 is an enlarged plan view of a portion of an individual variable speed belt and pulley unit provided with speed changing mechanism comprising a shaft formed in separable sections and provided with spur gear and clutch mechanism for operatively connecting the separable shaft sections with the corresponding individual variable speed changing belt and pulley mechanisms.

In constructing a paper machine provided with my improved driving and speed-controlling mechanism, in accordance with my invention, I provide a main frame 1, having longitudinal side frames 2, 2, suitably connected and braced, and adapted to form suitable supports for the moving parts of the machine, and which may be of any desired, suitable, ordinary or well known form. A series of dryer rolls 3 is mounted in the main frame of the machine, and comprises any desired number of dryer rolls each provided with an axle 4 journaled at its opposite ends in the corresponding side frames 2, 2 of the machine, said rolls having hollow cylindrical bodies located between the side frames, and the axes of all of the rolls being in parallel relation. These dryer rolls are spaced part and disposed in any desired number of superposed tiers—in this instance, three tiers—and are adapted to have wound upon the peripheries thereof and in position to travel through the entire series and between and in contact with the peripheries of the rolls, a web 5 of paper or paper pulp in process of being formed into a sheet of paper or fibrous material and dried. Mounted forward of the dryer rolls 3 and in position to receive therebetween an endless apron or belt of felt 6 carrying a layer or web of paper pulp from the vat 7 and rotative cylinder molds—not shown—is any desired number of pairs of superposed rolls 8, and 9, rotatively mounted upon or fixed to axles journaled in suitable bearings in the machine frame, the upper roll or rolls 8 being rubber-covered, and the lower roll or rolls 9 being covered with wire or reticulated material, adapted to enable the water to be squeezed or pressed out of the pulp or web 5 carried by the felt and passing between such rolls toward the drying rolls.

Located between the rolls 8, 9, and the dryer rolls is a set of preliminary pressing rolls 10, 11, commonly known as "primary press rolls," which are mounted upon suitable axles journaled in the machine frames, and are adapted to receive the felt apron 6 and web of pulp 5 between the upper rolls 10 and the lower rolls 11 of the set of primary press rolls as the web and felt travel from the vats and cylinder molds and from between the rolls 8, 9, toward the dryer rolls. The axles 12, 12 of a plurality of the lower primary press rolls 11 are operatively connected with each other and with a pair of first main press rolls 13, 13, the lower one of which has an axle 14 journaled in suitable bearings in the main frame and between and in parallel relation to the series of dryer rolls and the primary rolls 10. This connection may be made by means of gearing or belt and pulley mechanism, which, in this instance consists of a pair of belt pulleys 15, 15 fixed to the axle 14, a belt pulley 16, fixed to the axle 12 of one of the lower primary rolls 11, and a belt 17 mounted upon and connecting said last mentioned belt pulleys, and a belt pulley 18 fixed to another of the axles 12 and a belt 19 mounted on and connecting said belt pulleys 18 and the corresponding pulley 15 on the shaft 14.

Fixed to the shaft or axle 14 is a gear wheel 20 which is in toothed engagement with a pinion 21 fixed to a rotative shaft 22 journaled in suitable bearings and provided with a bevel gear wheel 23 fixed to said shaft 22 and in toothed engagement with a bevel pinion 24 to a shaft 25. The shaft 25 is journaled in suitable bearings in the main frame or other suitable support, and is provided with a belt pulley 26 fixed to said shaft 25 and operatively connected with a source of power or driving mechanism hereinafter more particularly described.

A second pair of main press rolls 27 are adapted to receive and press therebetween the moist felt and web of paper pulp as said web of paper pulp is passing to and into position to be engaged by the first of the series of dryer rolls; and the felt 6 is permitted to separate from the web of paper pulp and pass downward therefrom on its return to the vats and pulp carrying cylinders or molds from which the pulp is deposited upon the felt. The construction and arrangement of pulp-containing vats and cylinder molds may be of any ordinary and well known or desired form common and well known in the art. All of the dryer rolls 3 are operatively connected by means of a suitable train or trains of spur gears comprising a multiplicity of spur gear wheels 22 each fixed to a corresponding axle 4 of a dryer roll 3 to be driven by such gears, said gears being so connected in toothed engagement with each other as to rotate the dryer rolls in the proper directions relatively to each other to feed the web of paper or pulp between and in contact with the peripheries of the entire series of dryer rolls. The spur gear wheel 28 on the axle 4 of the first dryer roll 3 is also operatively connected with the axle 29 of the lower one of the pair of second main press rolls 27, by means of a spur gear wheel 30 fixed to the axle 29, and a spur-toothed idler wheel or pinion 31 rotatively mounted between and in toothed engagement with the spur wheels 28 and 30.

Mounted in parallel relation to the last roll 3 of the series of dryer rolls is a set of calender rolls 32 which are mounted in superposed parallel relation and adapted to permit the web of paper or pulp to pass therebetween to be operated upon thereby in the usual and ordinary and well known manner. Located rearward with respect to the calender rolls is a reel 33 fixed to a rotative axle 34 which is journaled in suitable bearings in the main frame, and which may be of any ordinary and well known form. An ordinary and well known form of slitter 34 is located directly back of the reel and in position to receive and operate upon the web of the paper as the latter passes to the slitter from the reel; and a winder 35 having one or more suitable winding rolls 36, 36, each fixed to a shaft 37, journaled in suitable bearings in the main frame, and operatively connected by means of gear wheels 38, 38, each fixed to a corresponding axle or shaft 37, and each engaged by a toothed gear wheel or pinion 39 fixed to a rotative driven shaft 40 located between the wheels 38, 38, and journaled in suitable bearings in the frame, is located adjacent to and rearward from the slitter in position to receive and wind the web of paper as the latter passes through and away from the series of dryer rolls to the winder in the operation of making and drying the paper or fibrous material or fabric to be operated upon.

In the art to which this invention relates, it is well known that great difficulty is experienced in practice in changing, varying, or controlling and regulating the speed of rotation of the dryer rolls with respect to each other, and with respect to the primary press rolls, main press rolls, calender rolls, reel mechanism, and winder mechanism, and in driving or operating these and other movable parts or elements of a paper machine at exactly the required rate of speed with respect to each other, so as to, so far as possible, prevent breakage, or injury to the web of paper or material being operated upon.

In order to enable these objects to be accomplished in a simple, economical and efficient manner and with facility, and to obtain other desirable results and advantages, I provide a main driving shaft 41 which is formed of any desired number of separable connected shaft sections 47, 87, and rotatively mounted in suitable bearings 42 in the machine frame or other suitable support. The sections of the main drive shaft 41 are connected by means of couplings 43, or other suitable form of connecting means; and a friction clutch cut-off coupling 44 which may be of any ordinary and well known suitable form in commercial use and common and well known in the art, forms a connection between the forward section 87 and next adjacent section 47 of the shaft, as shown near the right hand end of Fig. 1.

The main driving shaft 41 is operatively connected with a suitable source of power which, in this instance, consists of an electric motor 45, which may be of any ordinary and well known or suitable form. The means for operatively connecting the main driving shaft with the motor, or source of power, may be of any ordinary and well known or desired form. For example, a belt pulley 62 is here shown fixed to the main driving shaft 41, a pulley 63 fixed to the motor shaft 64, and a belt 65 mounted on and connecting said wheels. From the following description it will be readily understood, however, that an ordinary "Reeves" variable speed pulley, or a variable speed mechanism, such as any of the power-transmission mechanisms 80, 81. 82, 83, hereinafter more particularly described, may be interposed between and operatively connect the motor 45 and the main driving shaft 41.

The main driving shaft 41 is formed of connected separable shaft sections 47, 87, each shaft section 47 forming one of the shaft members of a corresponding variable speed power transmission mechanism 80, 81, 82, 83, hereinafter more particularly described, and all of which are, by preference directly connected with the shaft 41, in such a manner that the said main driving shaft 41, comprising connected shaft sections 47, 87, form a part of each of the connected variable speed power-transmission mechanisms 80, 81, 82, 83, and forms a direct connection between the same. A unitary variable speed power-transmission and driving mechanism is thus provided, as will hereinafter more fully appear.

Said main driving shaft 41 is operatively connected with the dryer rolls, press rolls, calender rolls, reel, slitter, winder mechanism, and other moving parts of the machine herein described and shown, as follows:

A counter shaft 66 is rotatively mounted in suitable bearings and connected with the main driving shaft 41 by means of a bevel gear wheel 67 fixed to the shaft 66 and in toothed engagement with a bevel pinion 68 fixed to the driving shaft 41. And said shaft 66 is operatively connected with the reel mechanism 33 by suitable gearing which in this instance comprises a belt pulley 69 fixed to said shaft, a pulley 70 fixed to a rotative shaft 71, a belt 72 on said pulleys, a gear wheel or sprocket 73 fixed to the shaft 71, a gear wheel or sprocket 74 fixed to the shaft 34' of the reel, and a chain or flexible element 75 mounted on and connecting said last mentioned gear wheels. The slitter 34 may be of any ordinary and well known form, and connected with the reel mechanism, or any suitable moving part of the machine, such, for instance, as the shaft 66, by any suitable gearing or connecting mechanism—not shown.

The main driving shaft 41 forms the belt-driving or "constant-speed" shaft of and for a plurality of connected variable-speed-power-transmission mechanisms 80, 81, 82 and 83, each of which comprises in its construction a supporting frame 86, in which is mounted a belt-driven or variable speed shaft 88 journaled in suitable bearings in said frame 86 in parallel relation to the main driving shaft 41. Said main driving shaft 41 comprises connected separable shaft sections 47. All of the belt-driven or variable speed shafts 88 are rotatively mounted independently of each other; and each is operatively connected with and adapted to have its speed of rotation varied or changed to exactly any desired or required extent or ratio relatively to the speed of rotation of the main driving shaft 41 within predetermined maximum and minimum limits of speed.

In each of the variable-speed power-transmission mechanisms 80, 81, 82, 83, a pair of truncated-cone shaped belt-driving disks or pulley wheel members 89, are mounted upon and rotative with the corresponding section of the main driving shaft 41, the pulley-wheel members of each of said pairs being movable toward and from each other or relatively in a direction lengthwise of the main driving shaft on which they are mounted by means of suitable splines or similar connecting members adapted to permit the disks to be shifted with respect to each other longitudinally of the shaft.

A second pair of similar, but belt-driven, disks or pulley wheel members 90, 90, are mounted upon and rotative with the driven or variable speed shaft 88 of each of the variable-speed power transmission mechanisms 80, 81, 82, 83, respectively, the wheel or disk members 90, of each pair being movable toward and from each other in a direction lengthwise of the shaft on which they are mounted by means of splines, keys, or similar connecting members adapted to permit the shifting of the disks of each pair toward and from each other, as well as longitudinally of the shafts on which the disks are adjustably or slidably mounted.

The truncated-cone shaped disk members of each pair of disks have their conical or tapered belt-engaging faces facing toward each other and adapted to engage the corresponding tapered or inclined margins of a belt 91, which is approximately V-shaped in cross-section, and has inclined side marginal faces which are at a corresponding angle to the conical surfaces of the disks between and in engagement with which the belt is mounted.

Pivotally mounted upon or connected with adjustable pivots 92, 92, located intermediate, and by preference, midway between said main driving shaft 41 and the variable speed shaft 88, of each of the transmission mechanisms 80, 81, 82, 83, and pivotally connected by means of a link 93, is a pair of disk-adjusting, shifting or operating levers 94, 94, each of which may be formed of a pair of upper and lower parallel bars extending from the main driving shaft 41 to the corresponding variable speed shafts 88, and adapted to admit said shafts between the upper and lower bars or spaced apart portions of the levers. These shifting levers are for shifting or adjusting the members of each pair of disks toward and from each other, to vary the speed of rotation of the shafts 88 of the respective transmission mechanisms 80, 81, 82, 83 with respect to each other and with respect to the main driving shaft 41 with which said variable speed shafts are operatively connected in the manner herein described.

Each of these shifting levers 94 is operatively connected with a corresponding belt-engaging driving disk 89 on the main driving shaft 41, by means of a yoke or connecting member 95 connected with such disk in such a manner as to permit the rotation of the same, and flexibly or pivotally connected with the lever. Each of the levers 94 is connected in a similar manner with the corresponding belt-engaging disk 90—there being a pair of disks 89, 89 and a pair of disks 90, 90 located between each pair of such shifting levers—by means of a swivel, socket member or connecting yoke 96 which is connected with the hub of such disk and with the lever 94 in such a manner as to form a flexible or swivel connection between such disk and lever.

Each shifting lever of each pair is also flexibly connected at or near one end of such lever, with a shifting or adjusting screw or threaded shaft 57, which is journaled in a suitable bearing in parallel relation to the main driving shaft 41 and variable speed shafts 88, there being one of said shifting screws for each pair of shifting levers, and one pair of shifting levers for each shaft 88.

Each shifting screw or shaft 57 is provided with right and left hand screw threads thereon, the left hand threads being located between the longitudinal center and one end of the shifting screw, and in operative engagement with one of the shifting levers of the corresponding pair of levers, and the right-hand screw threads being between the center and opposite end of the shifting screw and operatively connected with the other lever of the pair to be shifted by such screw.

Each of the levers 94 is provided with a threaded connecting member in the form of a socket or threaded yoke 98 having stems or pivot portions adapted to extend through or into suitable openings in the lever, each of said socket members being thus pivotally connected with its lever, and in threaded engagement with the correspondingly threaded portion of the shifting screw by means of which such lever is to be shifted or adjusted. It will thus be readily seen that by turning any shifting screw 57 in one direction, the corresponding engaged pair of shifting levers 94 will be shifted with respect to each other in such a manner that one end of the pair of levers will be brought closer together, and the other ends of such levers will be caused to move apart, so as to force one pair of belt-engaging disks located between such levers toward each other, thereby forcing the belt 91 outward between such disks and toward the peripheries thereof, and simultaneously cause the other pair of disks located between such levers, to be moved apart a corresponding distance thereby permitting the belt to shift inward between such disks and toward the axial centers thereof, thus varying the speed of rotation of the shafts 88 with respect to each other and with respect to the main driving shaft 41 to exactly any desired or required extent within predetermined maximum and minimum limits of speed, and enabling the shafts 88 to be rotated synchronously with respect to each other and with respect to the main driving shaft and at exactly any desired speed of rotation.

The variable speed shaft 88 of the transmission mechanism 80, is operatively connected with the press rolls 10 and 13, already described, by means of a gear or belt pulley wheel 100 fixed to said shaft 88 and a belt 101 mounted on said belt pulley and a similar belt pulley 26 fixed to the shaft 25 already described. The main driving shaft 41 is thus operatively connected with said press rolls 10 and 13.

The main driving shaft 41 is operatively connected with the forward group of dryer rolls 3, by means of the transmission mechanism 81 already described, and by means of a shaft 102 journaled in suitable bearings and connected with the shaft 88 of said transmission mechanism 81 by means of an ordinary friction clutch cut off coupling 103, which may be of any ordinary and well known form; the shaft 102 being operatively connected with said dryer rolls of the forward group of rolls by means of a rotative shaft 104 journaled in suitable bearings, a spur gear 105 fixed to the shaft 104 and in toothed engagement with adjacent gears 28, 28 of the dryer rolls, a bevel gear 106 fixed to the shaft 104, and a bevel pinion 107, which is fixed to the shaft 102 and in toothed engagement with the gear wheel 106.

The main driving shaft 41 is operatively connected with the next group of dryer rolls 3, by means of the transmission mechanism 82 already described, together with a shaft 108 journaled in suitable bearings and connected with the variable speed shaft 88 of said transmission mechanism 82 by means of an ordinary friction clutch-off coupling 109, which may be of any ordinary and well known form; the shaft 108 being operatively connected with said group of dryer rolls by means of a shaft 110 journaled in suitable bearings, a spur gear 111 fixed to the shaft 110 and in toothed engagement with adjacent gears 28, of said group of dryer rolls, a bevel gear wheel 112 fixed to the shaft 110, and a bevel pinion 113 fixed to the shaft 108 and in toothed engagement with the gear wheel 112.

The main driving shaft 41 is operatively connected with the calender mechanism 32, by means of the transmission mechanism 83 already described, together with a shaft 114 journaled in suitable bearings and connected with the variable speed shaft 88 of said transmission mechanism 83 by means of an ordinary friction clutch cut-off coupling 115 having frictionally engaged members connected with said shafts 114 and 88, respectively, the shaft 114 being operatively connected with the calender mechanism 32 by means of a shaft 116 journaled in suitable bearings, a gear wheel 117 fixed to the shaft 116, a gear wheel 118 fixed to the shaft 119 of a calender roll 32 and operatively engaged by or connected with the gear wheel 117 in any ordinary and well known manner, a bevel gear wheel 120 fixed to the shaft 116, and a bevel pinion 121 fixed to the shaft 114 and in toothed engagement with the gear wheel 120.

The means for operatively connecting the main driving shaft 41 with the winder mechanism and other moving parts at the rear or discharge end of the machine comprises a variable speed-power-mechanism 76 and connecting mechanism, which may be in the form of either of the power-transmission mechanisms, 80, 81, 82, 83, already described, but having a shaft 77 in lieu of the corresponding shaft section 47 of the main driving shaft 41. The shaft 88 of the transmission mechanism 76 is connected with the rotative shaft 40 of the winder mechanism by means of an ordinary clutch 79, or any other desired ordinary and well known form of connecting mechanism.

It is very desirable to provide simple and efficient means for enabling any one or more of a series of variable speed power transmission devices, such, for example, as the individual speed changing belt and pulley mechanisms 80, 81, 82, 83 to be adjusted independently to different variable speeds with respect to each other, or to be all changed or adjusted simultaneously and by a single operation to any desired speed.

In order to enable this and other objects of my invention to be accomplished in an efficient manner and with facility, I provide,—in the form of the device shown in Figs. 1 to 5, inclusive—a main speed changing shaft 122, which is operatively connected with a right and left threaded adjusting screw 57 of each of the individual variable speed power transmission devices 80, 81, 82, 83 to be controlled thereby, by means of suitable gear and clutch mechanism.

The main speed changing shaft 122 is rotatively mounted in suitable bearings and extends along and adjacent to the entire series of individual variable speed belt and pulley mechanisms or speed changing devices to be operatively connected therewith.

A gear or sprocket wheel 123 is mounted upon each right and left screw threaded speed changing adjusting screw 57; and for each gear or sprocket wheel 123, a similar gear or sprocket wheel 124 is fixed to the main speed changing shaft 122, as shown in Figs. 1 to 5, inclusive. Each gear or sprocket wheel 123 is operatively connected with its corresponding gear 124 by means of a sprocket chain 125, or similar or equivalent connecting means.

Each of the gears or sprocket wheels 123 is loosely mounted upon the speed changing screw 57 to be operated thereby, and is adapted to rotate freely with respect to the screw whenever the main speed changing shaft 122 is to be operated independently of and without operating said screw 57. Suitable clutch mechanism is provided for operatively connecting each gear or sprocket wheel 123 with the corresponding speed changing screw 57 and for releasing such screw from its operating gear wheel 123, when desired. The clutch mechanism may be of any desired ordinary or suitable form. In the form shown in the drawings, a movable friction clutch member or hub 126, which may form the hub of a gear or sprocket wheel 123, is loosely mounted upon and in freely rotative relation to each right and left threaded speed changing screw 57. A clutch member 127 is fixed to each speed changing screw 57 by means of a tapered pin 128, or other suitable securing means. A clutch operating and locking member, comprising a lock nut 129 which may form the hub of a hand wheel 131, is mounted in threaded engagement with a screw threaded portion 130 of each right and left threaded speed changing screw 57, and engages the adjacent movable clutch member 126. The hand wheel 131 and its hub or locking nut 129 thus serve as a means for locking and releasing the clutch.

Each speed changing screw 57 is also, by preference, provided with a hand wheel 132, or other suitable operating means fixed thereto for operating such speed changing screw independently of the main speed changing shaft 122 when the clutch members 126 and 127 are released or out of clutching engagement with each other. (See Figs. 3, 4 and 5.)

From the foregoing description, it will be readily understood by those skilled in the art that each individual speed changing screw 57 is adapted to be operatively connected with and disconnected from the main speed changing shaft 122 by means of the clutch and gear or connecting mechanism, above described; and that, although I prefer to mount the clutches upon the corresponding individual speed changing shafts 57, rather than upon the main speed changing shaft, it is possible to reverse the parts and to mount clutches upon the main shaft, if desired.

In Figs. 6, 7 and 10 is shown a modified form of my improved speed changing power transmission mechanism. In this modified form of the device, a main speed changing shaft 133 is provided, which extends along and adjacent to the entire series of individual speed changing power transmission belt and pulley mechanisms or units 80, 81, 82, 83 and is adapted to be operatively connected with and disconnected from any or all of said individual mechanisms or units, as desired. This shaft corresponds with the main speed changing shaft 122, already described, and is mounted in suitable bearings 134 in the frames 86. Each right and left threaded speed changing screw 57 is provided with a spur gear 135, fixed thereto. A spur gear wheel 136 is loosely mounted upon the shaft 133; and a friction clutch member 137 is provided which may form the hub of the gear wheel 136. The movable friction clutch member or hub 137 is thus adapted to be moved longitudinally of the shaft 133 into and out of clutching engagement with a mating frictional clutch member 138 which is fixed to the shaft 133 by means of a tapered pin 139, or other suitable means. A locking member or lock nut 140 is mounted in threaded engagement with a screw threaded portion 141 of the shaft 133, and in operative engagement with the movable clutch member or hub 137 of gear wheel 136, and is adapted to lock and release the clutch members 137 and 138.

A hand wheel or other suitable operating means 142 is fixed to the main speed changing shaft 133. And each individual right and left threaded screw 57 is provided with suitable operating means, such as an ordinary hand wheel 143 fixed thereto and adapted to provide convenient means for operating such individual right and left threaded screws independently of the main speed changing shaft 133, and independently of each other when desired.

In Figs. 8 and 9 is shown another or third form of my improved speed changing power transmission mechanism, in which a continuous sectional main speed changing shaft or right and left threaded screw 146 is provided, said sectional shaft or screw being formed of separable sections 144 and 145. The sectional shaft 146 is journaled in suitable bearings in the frames 86 of the series of individual speed changing belt and pulley mechanisms or variable speed power transmission devices or units 80, 81, 82, 83, already described. In this form of the device the main speed changing shaft or sectional screw 146 comprises in its construction a series of right and left screw threaded sections 144, one for each individual speed changing belt and pulley device or variable speed power transmission device 80, 81, 82, 83. And each of said right and left threaded sections 144 is constructed and adapted to operate in identically the same manner as the right and left threaded screws 57 already described. But the screw threaded shaft sections 144 are operatively connected with each other by means of intermediate abutting separably connected shaft sections 145 which are interposed between the sections 144 and between the adjacent or corresponding units 80, 81, 82, 83 so as to form a continuous sectional speed changing shaft. The sections of the shaft 146 are so constructed and connected as to permit the right and left screw-threaded shaft sections 144 to be readily separated and operated independently of each other when desired, and to enable all of the said sections 144 and 145 to be operated together and as one shaft, when desired. Each of the sections 145 of the complete shaft 146 is connected at one end with the corresponding right and left screw section 144 by means of an ordinary shaft coupling 147, or other suitable ordinary connecting means. And the opposite end of the shaft section 145—which is in abutting relation to the adjacent abutting end of the corresponding right and left threaded shaft section 144—is operatively connected with the latter by means of a friction clutch member 148 fixed to such screw threaded shaft section by suitable securing means, such as a tapered pin 149. And a movable clutch member 150 is loosely mounted on or in operative engagement with the clutch member 148, and, by preference, encircles the corresponding shaft section 145. (See Fig. 9.)

Suitable clutch operating, locking and releasing means, which may be in the form of a lock nut 151, in threaded engagement with the threaded portion 152 of the corresponding shaft section 145, is provided and adapted to lock the movable clutch member 150 in clutching engagement with the clutch member 148, and to release the clutch as desired. A hand wheel 153 may be fixed to each clutch operating member, nut, or hub 151 to provide convenient means for operating the same. And an operating wheel 154 of any desired form, is fixed to each clutch member or hub 148 on each of the right and left screw threaded sections 144, respectively, of the sectional speed changing shaft 146 thus provided. Each screw-threaded shaft section 144 is thus adapted to be operated independently, when desired.

A shaft operating wheel 155 is provided for operating the entire sectional shaft 146. The wheel 155 may be in the form of a sprocket wheel having a hub 156 adapted to form one of the movable clutch members mounted upon a corresponding shaft screw 145 of the sectional speed changing shaft 146. The clutch member or hub 156 is movable into and out of clutching engagement with the adjacent clutch member 148, and is interposed between one of said clutch members 148 and the adjacent clutch operating wheel or nut 151. Any suitable means for operating the gear or sprocket 155 may be employed, such, for example, as a sprocket chain 157.

From the foregoing, it will be readily understood that the mechanism shown in Figs. 8 and 9, is adapted to be operatively connected with a paper-making machine such as that herein shown and described, and constitutes an efficient means for changing the speed of any one or more, or all of a series of individual speed changing or variable speed power transmission devices 80, 81, 82, 83, and mechanisms to be operated thereby, or for changing the speed of other or similar mechanisms which are to be operated at varying speeds with respect to each other.

I claim:

1. In a machine of the class described, the combination of a plurality of individual variable speed belt and pulley power transmission mechanisms adapted to be adjusted to operate at varying speeds with respect to each other, means for operatively connecting each of said individual variable speed power transmission mechanisms with a mechanism to be operated, and means for adjusting a plurality of said individual variable speed power transmission mechanisms simultaneously, to regulate the speed of operation of the same.

2. In a machine of the class described, the combination of a plurality of individual variable speed power transmission mechanisms, each comprising a pair of belt-connected variable speed pulleys, means for operatively connecting each of said individual variable speed power transmission mechanisms with a mechanism to be operated, means for independently adjusting the belt and pulley mechanism of each of said individual power transmission mechanisms, respectively, and means for adjusting all of said variable speed belt and pulley mechanisms simultaneously, to regulate the speed of operation of the same.

3. In a mechanism of the class described, the combination of a plurality of individual variable speed power transmission mechanisms, each comprising a pair of belt-connected variable speed pulleys adapted to be operatively connected with a mechanism to be operated, a main speed changing shaft, and means for operatively connecting said main speed changing shaft with a plurality of said individual variable speed power transmission mechanisms and adapted to permit any desired predetermined one or more of said individual power transmission mechanisms to be independently disconnected from said main speed changing shaft.

4. In a mechanism of the class described, the combination of a plurality of individual variable speed power transmission mechanisms, each comprising a pair of belt-connected variable speed pulleys, means for operatively connecting each of said individual variable speed power transmission mechanisms with a mechanism to be operated thereby, a main speed changing shaft, and means for operatively connecting said main speed shaft with each of said individual variable speed power transmission mechanisms, respectively.

5. In a mechanism of the class described, the combination of a series of individual variable speed power transmission mechanisms, each comprising a pair of belt-connected variable speed pulleys, means for operatively connecting each of said individual variable speed power transmission mechanisms with a mechanism to be operated, a main speed changing shaft, means for detachably connecting said shaft with each of said individual variable speed power transmission mechanisms, respectively, and means for operating said series of individual variable speed power transmission mechanisms.

6. In a mechanism of the class described, the combination of a series of individual variable speed power transmission mechanisms, each comprising a pair of belt-connected variable speed pulleys, means for operatively connecting each of said individual variable speed power transmission mechanisms with a mechanism to be operated, a main speed changing shaft, means for independently connecting each of said individual variable speed power transmission mechanisms with and disconnecting the same from said main speed changing shaft, and means for operating said variable speed power transmission mechanisms.

7. In a mechanism of the class described, the combination of a plurality of individual variable speed power transmission mechanisms, each comprising a pair of belt-connected variable speed pulleys, means for operatively connecting each of said individual variable speed power transmission mechanisms with a mechanism to be operated, speed changing lever mechanism operatively connected with each of said pulley mechanisms, respectively, a main speed changing shaft, and means for operatively connecting the speed changing shaft with the lever mechanism of any desired one or more of said individual variable speed power transmission mechanisms.

8. In a machine of the class described, the combination of a plurality of individual variable speed power transmission mechanisms, each comprising a pair of belt-connected adjustable variable speed pulleys, means for operatively connecting each of said individual variable speed power transmission mechanisms with a mechanism to be operated thereby, speed changing screw and lever mechanism operatively connected with the pulley mechanism of each of said individual power transmission mechanisms respectively, and means for operatively connecting the screw and lever mechanisms of said individual variable speed power transmission mechanisms, respectively.

9. In a machine of the class described, the combination of a plurality of individual variable speed power transmission mechanisms, each comprising a pair of belt-connected adjustable variable speed pulleys, means for operatively connecting each of said individual variable speed power transmission mechanisms with a mechanism to be operated thereby, speed changing screw and lever mechanism operatively connected with the pulley mechanism of each of said individual power transmission mechanisms, respectively, a main speed changing shaft, and means for operatively connecting said main speed changing shaft with the screw and lever mechanisms of said individual variable speed power transmission mechanisms, respectively.

10. In a machine of the class described, the combination of a series of individual variable speed power transmission mechanisms, each comprising a pair of parallel rotative shaft members consisting of a driving shaft member and a variable speed countershaft, each of said countershafts being independently connected with a mechanism to be operated, a pair of sectional variable speed pulleys mounted on each pair of said parallel shaft members, a belt mounted upon and connecting each pair of said sectional pulleys, shifting lever mechanism in operative engagement with the movable sectional pulley members of each pair of variable speed pulleys for changing the speed of rotation of the corresponding pair of connected parallel shaft members with respect to each other, and means for shifting the lever mechanisms of said individual variable speed power transmission mechanisms, respectively, either simultaneously or successively and independently in any desired order.

11. In a machine of the class described, the combination of a series of individual variable speed power transmission mechanisms, each comprising a pair of parallel rotative shaft members consisting of a driving shaft member and a variable speed countershaft, each of said countershafts being independently connected with a mechanism to be operated, means for operating said driving shaft members, a pair of sectional variable speed pulleys mounted on each pair of said parallel shaft members, a belt mounted upon and connecting each pair of said sectional pulleys, shifting lever mechanism in operative engagement with the movable sectional pulley members of each pair of movable speed pulleys for changing the speed of rotation of the corresponding pair of connected parallel shaft members with respect to each other, a main speed changing shaft, and means for operatively connecting said shaft with and disconnecting it from the shifting lever mechanism of each of said individual variable speed power transmission mechanisms, respectively, and adapted to shift said lever mechanism simultaneously or successfully and independently of each other in any desired order.

12. In a machine of the class described, the combination of a series of individual variable speed power transmission mechanisms, each comprising a pair of parallel rotative shaft members consisting of a driving shaft member and a variable speed countershaft, each of said countershafts being independently connected with a mechanism to be operated, means for operating said driving shaft members, a pair of sectional variable speed pulleys mounted on each pair of said parallel shaft members, a belt mounted upon and connecting each pair of said sectional pulleys, shifting lever mechanism in operative engagement with the movable sectional pulley members of each pair of variable speed pulleys, for changing the speed of rotation of the corresponding pair of said connected parallel shaft members with respect to each other, a right and left threaded shifting screw operatively connected with the shifting lever mechanism of each pair of sectional variable speed pulleys, respectively, and means for operating said shifting screws either collectively and simultaneously or successively and independently of each other in any desired order.

13. In a machine of the class described, the combination of a series of rolls rotatively mounted in parallel relation and adapted to engage a web of material passing therebetween to be operated upon, a series of individual variable speed power transmission mechanisms each comprising a driving shaft member and a variable speed countershaft arranged in pairs and in parallel relation, each of said countershafts being independently connected with different rolls of said series of web-engaging rolls, means for operatively connecting said driving shaft members with a source of power, a pair of sectional variable speed pulleys mounted on each pair of said parallel shaft members, a belt mounted upon and connecting each pair of said sectional pulleys, shifting lever mechanism in operative engagement with each pair of belt-connected pulleys, respectively, a right and left threaded shifting screw in engagement with the lever mechanism for each pair of belt connected pulleys, a main speed changing shaft, and means for operatively connecting the main speed changing shaft with and disconnecting the same from any desired predetermined one or more of a plurality of said shifting screws.

Signed at Chicago, in the county of Cook and State of Illinois this 8th day of August, 1922.

FRANK A. HEADSON.

Witness:
HARRY I. CROMER.